May 19, 1931.  W. H. TRIMBLE ET AL  1,805,857
BATTERY TERMINAL CLAMP
Filed Feb. 4, 1929   2 Sheets-Sheet 1

William H. Trimble
John N. Clark
INVENTORS

BY Victor J. Evans
ATTORNEY

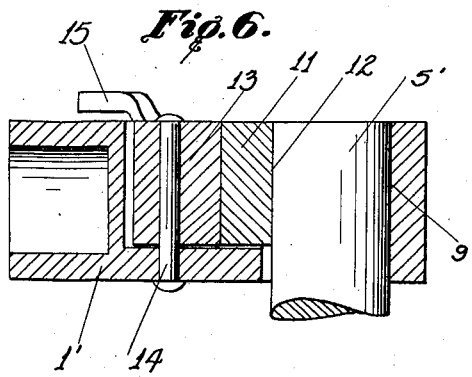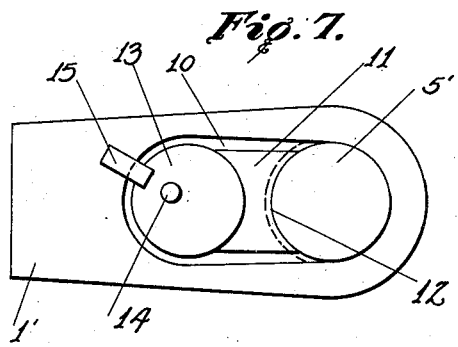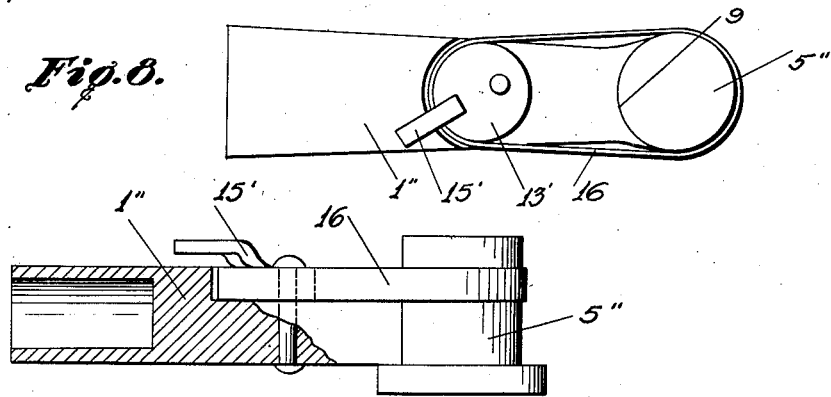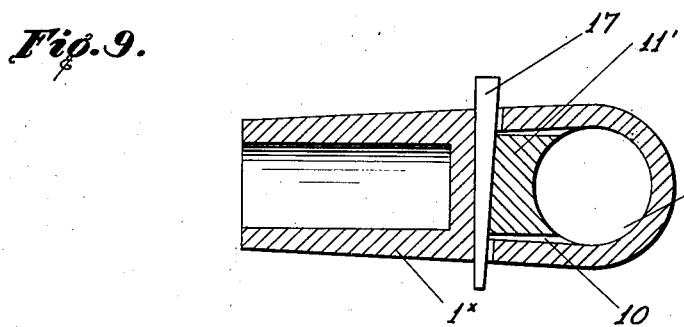

Patented May 19, 1931

1,805,857

UNITED STATES PATENT OFFICE

WILLIAM H. TRIMBLE AND JOHN N. CLARK, OF DALLAS, TEXAS

BATTERY TERMINAL CLAMP

Application filed February 4, 1929. Serial No. 337,351.

This invention relates to means for clamping one object to another, the invention being mainly designed for clamping a conductor terminal to a battery post, the general object of the invention being to provide means whereby the terminal can be easily and quickly clamped to the post without the use of screws, bolts or the like.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 6 is a sectional view through the body, showing a modification.

Figure 7 is a plan view of said modification.

Figure 8 is a plan view of another modification.

Figure 9 is a side view partly is section, of said modification.

Figure 10 is a sectional view showing another modification.

Figure 1:
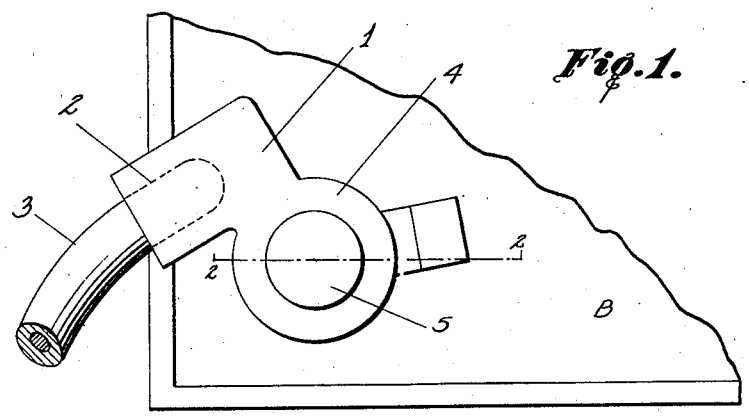
Figure 1 is a partial plan view of a battery, showing the preferred form of clamp used to attach the terminal to the post of the battery.
Figures 2, 3:
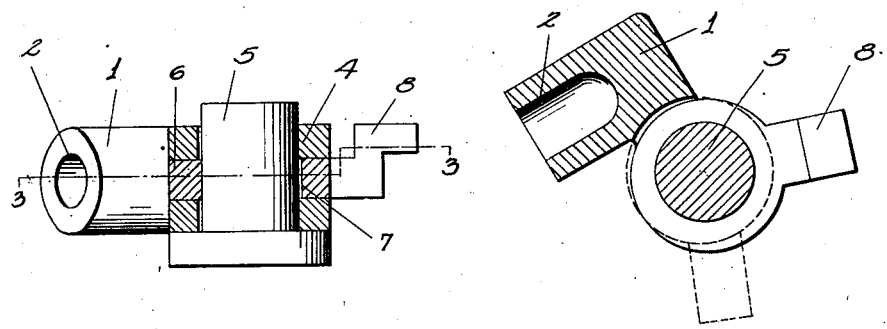
Figure 2 is a section on line 2—2 of Figure 1.
Figure 3 is a section on line 3—3 of Figure 2.
Figure 4:
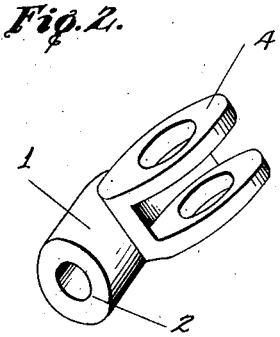
Figure 4 is a perspective view of the body of the terminal.
Figure 5:
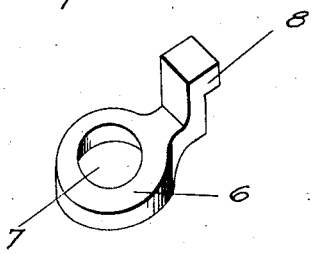
Figure 5 is a perspective view of the eccentric ring.

Referring to Figures 1 to 5, the numeral 1 indicates the body of the terminal which is formed with a socket 2 to receive the end of the cable or conductor 3 and said body is formed with the ring-shaped parts 4 which extend from one side of the body adjacent an end thereof, these ring-shaped parts being spaced apart and they are adapted to fit over the post 5 of the battery B or other object to which the body is to be connected. A ring 6, having its opening 7 eccentrically arranged, fits between the ring parts 4 and the opening 7 receives the post. This ring 7 is provided with the handle 8 and as will be seen, when the ring is turned through means of its handle, the engagement of a part of the outer circumference of the ring with the wall between the two ring parts 4 will cause the walls of the opening 7 to frictionally engage the post and thus set up a clamping action which will lock the device to the post. A slight blow on the handle will cause the ring 6 and the ring parts 4 to so engage the post that the device will be firmly locked to the post and there will be no danger of the parts becoming detached. A blow in the opposite direction will act to loosen the clamp from the post.

Thus it will be seen that we have provided simple means for attaching a terminal to a battery post without the use of screws, bolts or the like and the terminal can be easily and quickly attached to or detached from the post.

In the modification shown in Figures 6 and 7, the body 1' is formed with an opening 9 to receive the post 5' and said body is also formed with a recess 10 which has one end communicating with the opening 9. A member 11 is placed in the central part of the recess and is formed with oppositely arranged semi-circular recesses 12, one of which receives a portion of the post and the other of which receives a portion of an eccentric member 13 which is fastened in the recess by a pin 14. The eccentric is provided with a handle 15 whereby it can be partly rotated to cause the member 11 to frictionally engage the post so as to clamp the terminal to the post. By moving the eccentric in an opposite direction, the clamping action of the member 11 will be released so that the terminal can be removed from the post.

In the modification shown in Figures 8 and 9, one end of the body 1" is formed with a substantially semi-circular recess 9' to receive portion of the post 5" and this body is also formed with a recess in its upper portion in which is placed the eccentric 13' and a band 16, preferably of metal, passes around the post and the eccentric so that movement of the eccentric will cause the band to grip the post and thus lock the terminal to the post. This eccentric is also provided with a handle 15'.

In the modification shown in Figure 10, the body 1ˣ is formed with an opening 9" to receive the post and it is also formed with a recess 10' to receive a member 11' having a semi-circular recess to receive part of the post. The body is also provided with a hole which communicates with the recess and into which a wedge 17 is adapted to be driven so that said wedge will force the member 11' against the post and thus cause said member to lock the terminal to the post.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. A battery terminal clamp comprising a body having a pair of ring shaped parts spaced apart with their openings in alignment and a curved wall connecting portions of the ring shaped parts together, a ring rotatably arranged between the ring parts and having a part contacting the inner face of the curved wall, said ring having an eccentric opening therein to receive the battery post and a handle connected with the ring and having an upwardly extending part.

2. A battery terminal clamp comprising a body provided with a cable receiving means and having a pair of ring-shaped parts connected together in spaced relation and having their openings in alignment, a ring rotatably arranged between the ring parts, a handle connected to the ring and having an upwardly extending part and means whereby movement of the ring will displace its opening in relation to the openings in the ring parts so that the ring parts and the ring will grip a battery post.

In testimony whereof we affix our signatures.

WILLIAM H. TRIMBLE.
JOHN N. CLARK.